(12) United States Patent
Larson

(10) Patent No.: US 10,408,469 B2
(45) Date of Patent: Sep. 10, 2019

(54) METHOD AND APPARATUS FOR POSITIONING HEATING ELEMENTS

(71) Applicant: PROGRESS PROFILES SPA, Asolo (TV) (IT)

(72) Inventor: David D. Larson, Golden, CO (US)

(73) Assignee: PROGRESS PROFILES SPA (IT)

( * ) Notice: Subject to any disclaimer, the term of this patent is extended or adjusted under 35 U.S.C. 154(b) by 0 days.

(21) Appl. No.: 16/121,232

(22) Filed: Sep. 4, 2018

(65) Prior Publication Data

US 2018/0372338 A1    Dec. 27, 2018

Related U.S. Application Data

(60) Continuation of application No. 15/648,152, filed on Jul. 12, 2017, now Pat. No. 10,107,505, which is a
(Continued)

(51) Int. Cl.
*F24D 13/02* (2006.01)
*E04F 15/18* (2006.01)
(Continued)

(52) U.S. Cl.
CPC .............. *F24D 13/02* (2013.01); *E04B 5/48* (2013.01); *E04F 15/02* (2013.01); *E04F 15/182* (2013.01);
(Continued)

(58) Field of Classification Search
CPC ........ F24D 3/142; F24D 3/141; F24D 13/024; F24D 3/144; F24D 13/02; E04F 15/18; E04F 15/182; E04F 2203/04; E04F 2290/023; H05B 3/06; H05B 3/56; Y02B 30/26
(Continued)

(56) References Cited

U.S. PATENT DOCUMENTS 254,269 A    2/1882  Brown
584,875 A    6/1897  Jameton
(Continued)

FOREIGN PATENT DOCUMENTS

CA    1186470        5/1985
CA    2822392 A1  *  3/2014  ............ E04F 15/182
(Continued)

OTHER PUBLICATIONS

U.S. Appl. No. 16/013,698, filed Jun. 20, 2018.
(Continued)

*Primary Examiner* — Joshua J Michener
*Assistant Examiner* — Matthew J Gitlin
(74) *Attorney, Agent, or Firm* — Sheridan Ross P.C.

(57) ABSTRACT

An underlayment system is provided that includes a plurality of protrusions that extend from a common base member. The protrusions and base member can include an opening therethrough that allows for subsequent layers of material, such as adhesive, to interact and bond to each other. The protrusions are arranged in such a way to contain a wire, string, or heating element, within a receiving area. The arrangement of the protrusions allow for routing of the wire, string, or heating element in a variety of angles, bends, and other routing layouts.

20 Claims, 5 Drawing Sheets

Related U.S. Application Data continuation of application No. 15/260,848, filed on Sep. 9, 2016, now Pat. No. 9,777,931, which is a division of application No. 14/829,108, filed on Aug. 18, 2015, now Pat. No. 9,625,163.

(60) Provisional application No. 62/038,733, filed on Aug. 18, 2014.

(51) Int. Cl.
*E04F 15/02* (2006.01)
*E04B 5/48* (2006.01)
*F24D 3/14* (2006.01)

(52) U.S. Cl.
CPC ............ *E04F 15/185* (2013.01); *F24D 3/141* (2013.01); *E04F 2290/023* (2013.01); *Y02B 30/24* (2013.01); *Y02B 30/26* (2013.01)

(58) Field of Classification Search
USPC ................ 237/69, 1 R; 165/49, 168, 53, 56; 52/220.3, 386
See application file for complete search history.

(56) References Cited

U.S. PATENT DOCUMENTS

| | | |
|---|---|---|
| 731,158 A | 6/1903 | Blackmore |
| 1,485,370 A | 3/1924 | Cumfer |
| 1,549,773 A | 8/1925 | Hynes |
| 1,809,620 A | 6/1931 | Cole |
| 1,961,374 A | 6/1934 | Mazer |
| 2,139,512 A | 12/1938 | Nagorny |
| 2,325,303 A | 7/1943 | Brooke |
| 2,502,642 A | 4/1950 | Currlin |
| 2,928,445 A | 3/1960 | Van Buren, Jr. |
| 2,956,785 A | 10/1960 | Richl |
| 3,135,040 A | 6/1964 | Watson |
| 3,235,712 A | 2/1966 | Watson |
| 3,288,998 A | 11/1966 | Press, Jr. |
| 3,419,457 A | 12/1968 | Bleasdale |
| 3,434,401 A | 3/1969 | Kiewit |
| 3,487,579 A | 1/1970 | Brettingen |
| 3,495,367 A | 2/1970 | Kobayashi |
| 3,597,891 A | 8/1971 | Martin |
| 3,695,615 A | 10/1972 | Shoptaugh |
| 3,757,481 A | 9/1973 | Skinner |
| 3,802,790 A | 4/1974 | Blackburn |
| 3,854,372 A | 12/1974 | Gutshall |
| 4,016,692 A | 4/1977 | Jordan et al. |
| 4,183,167 A | 1/1980 | Jatich |
| 4,188,231 A | 2/1980 | Valore |
| 4,222,695 A | 9/1980 | Sarides |
| 4,250,674 A | 2/1981 | Feist |
| 4,326,366 A * | 4/1982 | Werner .................. F24D 3/142 52/220.3 |
| 4,338,994 A | 7/1982 | Hewing et al. |
| 4,576,221 A | 3/1986 | Fennesz |
| 4,640,067 A * | 2/1987 | Hagemann .............. F24D 3/142 52/220.3 |
| 4,640,854 A | 2/1987 | Radtke |
| 4,889,758 A | 12/1989 | Rinkewich |
| 4,923,733 A | 5/1990 | Herbst |
| 4,955,471 A | 9/1990 | Hirose et al. |
| 4,993,202 A | 2/1991 | Thiel |
| 4,997,308 A | 3/1991 | Welling, Jr. |
| 5,042,569 A | 8/1991 | Siegmund |
| 5,052,161 A | 10/1991 | Whitacre |
| 5,078,203 A | 1/1992 | Shiroki |
| 5,082,712 A | 1/1992 | Starp |
| D325,428 S | 4/1992 | Vitsur |
| 5,105,595 A | 4/1992 | Tokei et al. |
| 5,131,458 A | 7/1992 | Bourne et al. |
| 5,374,466 A | 12/1994 | Bleasdale |
| 5,381,709 A | 1/1995 | Louw |
| 5,386,670 A | 2/1995 | Takeda et al. |
| 5,443,332 A | 8/1995 | Hollis |
| 5,447,433 A | 9/1995 | Perry, Jr. |
| 5,480,259 A | 1/1996 | Thrower |
| 5,499,476 A | 3/1996 | Adams et al. |
| D372,158 S | 7/1996 | Bonaddio et al. |
| D370,034 S | 8/1996 | Kipfer |
| 5,585,154 A | 12/1996 | Rhoades |
| 5,619,832 A | 4/1997 | Myrvold |
| 5,789,462 A | 8/1998 | Motani et al. |
| 5,863,440 A | 1/1999 | Rink et al. |
| 6,076,315 A | 6/2000 | Kondo |
| 6,094,878 A | 8/2000 | Schluter |
| 6,178,662 B1 | 1/2001 | Legatzke |
| 6,220,523 B1 | 4/2001 | Fiedrich |
| 6,279,427 B1 | 8/2001 | Francis |
| 6,283,382 B1 | 9/2001 | Fitzmeyer |
| 6,434,901 B1 | 8/2002 | Schluter |
| 6,539,681 B1 | 4/2003 | Siegmund |
| 6,805,298 B1 | 10/2004 | Corbett |
| 6,918,217 B2 | 7/2005 | Jakob-Bamberg et al. |
| D508,332 S | 8/2005 | Julton |
| 7,118,138 B1 | 10/2006 | Rowley et al. |
| D541,396 S | 4/2007 | Fawcett et al. |
| 7,250,570 B1 | 7/2007 | Morand et al. |
| D551,152 S | 9/2007 | Funk et al. |
| D568,006 S | 4/2008 | Shin |
| D587,358 S | 2/2009 | Stephan et al. |
| 7,488,523 B1 | 2/2009 | Muncaster et al. |
| 7,585,556 B2 | 9/2009 | Julton |
| 7,669,371 B2 | 3/2010 | Hill |
| 7,880,121 B2 | 2/2011 | Naylor |
| D636,098 S | 4/2011 | Reynolds et al. |
| 8,002,241 B1 | 8/2011 | Shaw |
| D659,529 S | 5/2012 | Ojanen et al. |
| 8,176,694 B2 | 5/2012 | Batori |
| 8,220,221 B2 | 7/2012 | Gray |
| 8,288,689 B1 | 10/2012 | Adelman |
| 8,341,911 B2 | 1/2013 | Collison et al. |
| 8,414,996 B2 | 4/2013 | Senior |
| 8,517,473 B2 | 8/2013 | Monyak et al. |
| 8,573,901 B2 | 11/2013 | de Souza Filho et al. |
| D706,459 S | 6/2014 | Schluter et al. |
| D709,368 S | 7/2014 | van de Klippe et al. |
| D709,369 S | 7/2014 | van de Klippe et al. |
| D712,159 S | 9/2014 | Clerici et al. |
| 8,950,141 B2 | 2/2015 | Schluter et al. |
| 8,955,278 B1 | 2/2015 | Mills |
| D733,558 S | 7/2015 | Wyne |
| D747,502 S | 1/2016 | Reynolds et al. |
| D747,503 S | 1/2016 | Reynolds et al. |
| 9,228,749 B2 | 1/2016 | Morand et al. |
| 9,248,492 B2 | 2/2016 | Sullivan et al. |
| 9,275,622 B2 | 3/2016 | Claeys et al. |
| 9,284,693 B2 | 3/2016 | Tabibnia |
| 9,416,979 B2 | 8/2016 | Larson |
| 9,482,262 B2 | 11/2016 | Richards |
| D773,697 S | 12/2016 | Amend |
| 9,518,746 B2 | 12/2016 | Larson |
| 9,625,163 B2 | 4/2017 | Larson |
| 9,719,265 B2 | 8/2017 | Bordin et al. |
| 9,726,383 B1 | 8/2017 | Bordin |
| D797,957 S | 9/2017 | Larson |
| 9,777,931 B2 | 10/2017 | Larson |
| D813,421 S | 3/2018 | Larson |
| 1,000,664 A1 | 6/2018 | Larson |
| 1,010,750 A1 | 10/2018 | Larson |
| 2002/0109291 A1 | 8/2002 | Lawrence |
| 2003/0024190 A1 | 2/2003 | Stanchfield |
| 2005/0184066 A1 | 8/2005 | Brooks et al. |
| 2006/0086717 A1 | 4/2006 | Oosterling |
| 2006/0260233 A1 | 11/2006 | Schluter |
| 2006/0265975 A1 | 11/2006 | Geffe |
| 2006/0278172 A1 | 12/2006 | Ragonetti et al. |
| 2007/0039268 A1 | 2/2007 | Ambrose, Jr. et al. |
| 2007/0056233 A1 | 3/2007 | Kang et al. |
| 2008/0017725 A1 | 1/2008 | Backman, Jr. |
| 2008/0173060 A1 | 7/2008 | Cymbalisty et al. |
| 2008/0276557 A1 | 11/2008 | Rapaz |

(56) References Cited

U.S. PATENT DOCUMENTS

| | | | |
|---|---|---|---|
| 2008/0290503 A1 | 11/2008 | Karavakis et al. | |
| 2008/0290504 A1 | 11/2008 | Karavakis et al. | |
| 2008/0295441 A1 | 12/2008 | Carolan et al. | |
| 2009/0026192 A1 | 1/2009 | Fuhrman | |
| 2009/0230113 A1* | 9/2009 | Batori | E04F 15/18 |
| | | | 219/213 |
| 2010/0048752 A1 | 2/2010 | Vignola et al. | |
| 2011/0047907 A1* | 3/2011 | Smolka | F24D 13/024 |
| | | | 52/220.1 |
| 2014/0069039 A1* | 3/2014 | Schluter | E04F 15/182 |
| | | | 52/390 |
| 2015/0345155 A1 | 12/2015 | Pastrana | |
| 2016/0061355 A1 | 3/2016 | Sherman et al. | |
| 2017/0073980 A1 | 3/2017 | Szonok | |
| 2017/0175389 A1 | 6/2017 | Liang et al. | |
| 2017/0284108 A1 | 10/2017 | Larson | |
| 2017/0307228 A1 | 10/2017 | Bordin | |
| 2018/0051892 A1 | 2/2018 | Bordin | |
| 2018/0051893 A1 | 2/2018 | Bordin et al. | |
| 2018/0299140 A1 | 10/2018 | Larson | |

FOREIGN PATENT DOCUMENTS

| | | |
|---|---|---|
| CH | 657690 | 9/1986 |
| DE | 2840149 | 3/1980 |
| DE | 8129930 | 2/1982 |
| DE | 8413516 | 10/1984 |
| DE | 3317131 | 11/1984 |
| DE | 8429708 | 2/1985 |
| DE | 3730144 | 4/1988 |
| DE | 3543688 | 3/1990 |
| DE | 4201553 | 11/1992 |
| DE | 9114591 | 3/1993 |
| DE | 4230168 | 8/1993 |
| DE | 4226312 | 2/1994 |
| DE | 4210468 | 6/1994 |
| DE | 4242026 | 6/1994 |
| DE | 29609497 | 8/1996 |
| DE | 29822293 | 4/1999 |
| DE | 19750277 | 5/1999 |
| DE | 19828607 | 12/1999 |
| DE | 19936801 | 8/2000 |
| DE | 19912922 | 1/2001 |
| DE | 10040643 | 11/2001 |
| DE | 202006013453 | 11/2006 |
| DE | 102006004626 | 8/2007 |
| DE | 102006004755 | 8/2007 |
| DE | 202007014616 | 12/2007 |
| EM | 001079214-0005 | 3/2009 |
| EP | 0035722 | 9/1981 |
| EP | 0044469 | 1/1982 |
| EP | 60547 | 9/1982 |
| EP | 74490 | 3/1983 |
| EP | 133556 | 2/1985 |
| EP | 189020 | 7/1986 |
| EP | 367176 | 5/1990 |
| EP | 368804 | 5/1990 |
| EP | 437999 | 7/1991 |
| EP | 514684 | 11/1992 |
| EP | 0582031 | 2/1994 |
| EP | 0448928 | 3/1994 |
| EP | 0637720 | 2/1995 |
| EP | 0811808 | 12/1997 |
| EP | 0947778 | 10/1999 |
| EP | 1054217 | 11/2000 |
| EP | 1068413 | 1/2001 |
| EP | 1074793 | 2/2001 |
| EP | 1096079 | 5/2001 |
| EP | 1338413 | 8/2003 |
| EP | 1063478 | 10/2003 |
| EP | 1134503 | 11/2003 |
| EP | 1208332 | 3/2004 |
| EP | 1460345 | 9/2004 |
| EP | 1462727 | 9/2004 |
| EP | 1770337 | 4/2007 |
| EP | 1531306 | 2/2008 |
| EP | 2466029 | 2/2015 |
| EP | 2584272 | 5/2016 |
| FR | 2695986 | 3/1994 |
| FR | 2746426 | 9/1997 |
| GB | 2006548 | 5/1979 |
| GB | 2097836 | 11/1982 |
| GB | 2364565 | 1/2002 |
| GB | 2373042 | 9/2002 |
| GB | 2444241 | 6/2008 |
| JP | H01-139935 | 6/1989 |
| JP | H05-264051 | 10/1993 |
| JP | 2001-012067 | 1/2001 |
| JP | 2005-249303 | 9/2005 |
| JP | 2008-025295 | 2/2008 |
| KR | 1998-063147 | 11/1998 |
| KR | 200152632 | 4/1999 |
| KR | 200195437 | 6/2000 |
| KR | 200387066 | 6/2005 |
| KR | 100869841 | 11/2008 |
| KR | 20090088978 | 8/2009 |
| WO | WO 82/03099 | 9/1982 |
| WO | WO 95/22671 | 8/1995 |
| WO | WO 2004/111544 | 12/2004 |
| WO | WO 2006/123862 | 11/2006 |
| WO | WO 2008/098413 | 8/2008 |

OTHER PUBLICATIONS

U.S. Appl. No. 29/547,874, filed Dec. 8, 2015 now U.S. Pat. No. D.797,957.

U.S. Appl. No. 14/829,108, filed Aug. 18, 2015 now U.S. Pat. No. 9,625,163.

U.S. Appl. No. 15/260,848, filed Sep. 9, 2016 now U.S. Pat. No. 9,777,931.

U.S. Appl. No. 15/648,152, filed Jul. 12, 2017 now U.S. Pat. No. 10,107,505.

U.S. Appl. No. 15/796,225, filed Oct. 27, 2017.

U.S. Appl. No. 62/038,733, filed Aug. 18, 2014.

U.S. Appl. No. 15/504,188, filed Feb. 15, 2017.

U.S. Appl. No. 15/070,960, filed Mar. 15, 2016 now U.S. Pat. No. 9,719,265.

U.S. Appl. No. 15/185,576, filed Jun. 17, 2016 now U.S. Pat. No. 9,726,383.

U.S. Appl. No. 29/573,009, filed Aug. 2, 2016.

U.S. Appl. No. 15/647,510, filed Jul. 12, 2017.

U.S. Appl. No. 15/796,328, filed Oct. 27, 2017.

"5 Facts You May Not Know About Heated Flooring," southcypress.com, Sep. 12, 2015, 4 pages [retrieved Aug. 3, 2016 from: https://web.archive.org/web/20150912220312/http://www.southcypress.com/v3/articles/heated-flooring.htm].

"Ditra Heat," GlensFalls Tile & Supplies, Sep. 4, 2014, 1 page [retrieved Aug. 3, 2016 from: http://www.glensfallstile.com/general-tips/ditra-heat/772/].

"Illustrated price list BT 7," Schlüter-Systems KG, Dec. 7, 28 pages.

"Wall Skimmer Octagonal Nut (on-line)," National Pool Wholesalers, dated Aug. 12, 2012, 1 page [retrieved from internet Nov. 18, 2016, URL: https://web.archive.org/web/20120812084211/http://www.nationalpoolwholesalers.com/_Wall_Skimmer_Octagonal_Nut_--SKU_PWSP17BUW.html].

Polypipe Brochure; "Redefining Heating Systems," www.ufch.com; Polyplumb: Hot & Cold Plumbing & Heating System; © 2006, Polypipe Group; Printed: Feb. 2007, 44 pages.

Schluter Systems, Profile of Innovation, Illustrated Price List, Jan. 1, 2008, 2 pages.

International Search Report and Written Opinion for International (PCT) Patent Application No. PCT/US2015/045688, dated Nov. 12, 2015 9 pages.

International Preliminary Report on Patentability for International (PCT) Patent Application No. PCT/US2015/045688, dated Mar. 2, 2017 8 pages.

Extended European Search Report for European Patent Application No. 15833528.1, dated Dec. 14, 2017, 14 pages.

(56) References Cited

OTHER PUBLICATIONS

Official Action for U.S. Appl. No. 14/829,108, dated Jan. 20, 2016, 10 pages.
Third Party Submission for U.S. Appl. No. 14/829,108, dated Aug. 17, 2016, 17 pages.
Official Action for U.S. Appl. No. 14/829,108, dated Aug. 18, 2016 5 pages Restriction Requirement.
Notice of Allowance for U.S. Appl. No. 14/829,108, dated Dec. 21, 2016 7 pages.
Official Action for U.S. Appl. No. 15/260,848, dated Oct. 11, 2016 10 pages.
Official Action for U.S. Appl. No. 15/260,848, dated Mar. 17, 2017 11 pages.
Notice of Allowance for U.S. Appl. No. 15/260,848, dated Jun. 2, 2017 7 pages.
Official Action for U.S. Appl. No. 15/648,152, dated Aug. 11, 2017 10 pages.
Official Action for U.S. Appl. No. 15/648,152, dated Sep. 20, 2017 16 pages.
Official Action for U.S. Appl. No. 15/648,152, dated Apr. 18, 2018 12 pages.
Notice of Allowance for U.S. Appl. No. 15/648,152, dated Jul. 25, 2018 7 pages.
Official Action for U.S. Appl. No. 15/796,225, dated Dec. 22, 2017 16 pages.
Official Action for U.S. Appl. No. 15/504,188, dated Oct. 19, 2017 7 pages.
Official Action for U.S. Appl. No. 15/504,188, dated Jun. 19, 2018 8 pages.
M-D Building Products, Inc.'s Answer to Progress Profiles SPA's Complaint, filed Oct. 23, 2018 37 pages.
Official Action for U.S. Appl. No. 15/796,225, dated Jul. 27, 2018 11 pages.
Notice of Allowance for U.S. Appl. No. 15/796,225, dated Nov. 5, 2018 5 pages.
U.S. Appl. No. 29/681,568, filed Feb. 26, 2019.
U.S. Appl. No. 29/681,569, filed Feb. 26, 2019.
U.S. Appl. No. 29/681,570, filed Feb. 26, 2019.
Defendants M-D Building Products, Inc. and Loxcreen Canada LTD.'s Preliminary Invalidity Contentions, filed Feb. 19, 2019 202 pages.
Official Action for Canadian Patent Application No. 2,958,571, dated Apr. 12, 2019, 4 pages.
Intention to Grant for European Patent Application No. 15833528.1, dated Oct. 25, 2018 6 pages.
Extended European Search Report for European Patent Application No. 19167867.1, dated May 16, 2019 13 pages.
Official Action for U.S. Appl. No. 15/504,188, dated May 8, 2019 10 pages.

\* cited by examiner

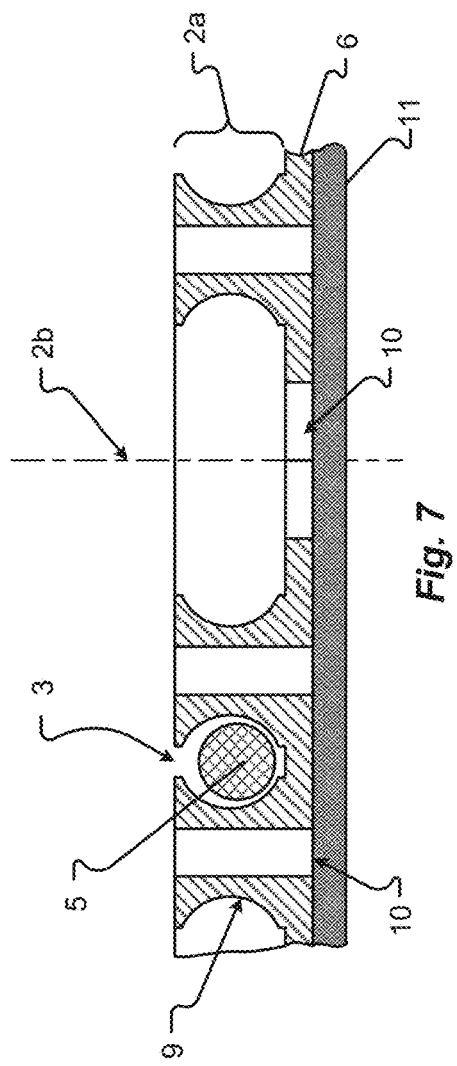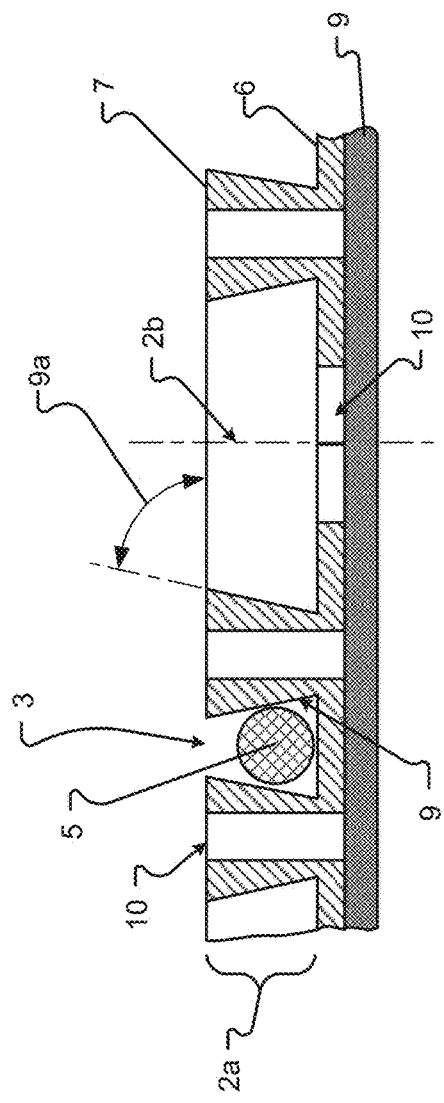

METHOD AND APPARATUS FOR POSITIONING HEATING ELEMENTS

CROSS REFERENCE TO RELATED APPLICATIONS

The present application claims the benefit of, and is a continuation of, U.S. patent application Ser. No. 15/648,152, filed Jul. 12, 2017, which is a continuation of U.S. patent application Ser. No. 15/260,848, filed Sep. 9, 2016, now U.S. Pat. No. 9,777,931, which is a divisional of U.S. patent application Ser. No. 14/829,108, filed Aug. 18, 2015, now U.S. Pat. No. 9,625,163, which claims the benefit of U.S. Provisional Patent Application Ser. No. 62/038,733, filed Aug. 18, 2014, all of which are fully incorporated by reference herein.

FIELD OF THE INVENTION

Embodiments of the present invention are generally related to underlayments associated with radiant floor or wall heating systems.

BACKGROUND

In-floor and in-wall heating and cooling is well known that utilizes heat conduction and radiant heat, for example, for indoor climate control rather than forced air heating that relies on convection. The heat is usually generated by a series of pipes that circulate heated water or by electric cable, mesh, or film that provide heat when a current is applied thereto. In-floor radiant heating technology is used commonly in homes and businesses today.

Electrical floor heating systems have very low installation costs and are well suited for kitchens, bathrooms, or in rooms that require additional heat, such as basements. One advantage of electric floor heating is the height of installation. For example, floor buildup can be as little as about one millimeter as the electric cables are usually associated with a specialized installation board or directly onto the sub floor. Electric underfloor heating is also installed very quickly, usually taking a half a day to a day depending on the size of the area to be heated. In addition, warm up times are generally decreased because the cables are installed approximate to the finished flooring, e.g., tile, wherein direct connection is made with the heat source rather than a stored water heater as in fluid-based systems. Electric systems are offered in several different forms, such as those that utilize a long continuous length cable or those that employ a mat with embedded heating elements. In order to maximize heat transfer, a bronze screen or carbon film heating element may be also used. Carbon film systems are normally installed under the wire and onto a thin insulation underlay to reduce thermal loss to the sub floor. Vinyls, carpets, and other soft floor finishes can be heated using carbon film elements or bronze screen elements.

Another type of in-floor heating system is based on the circulation of hot water, i.e., a "hydronic" system. In a hydronic system, warm water is circulated through pipes or tubes that are incorporated into the floor and generally uses pipes from about $11/16$ inch to 1 inch to circulate hot water from which the heat emanates. The size of tubes generally translates into a thicker floor, which may be undesirable. One other disadvantage of a hydronic system is that a hot water storage tank must be maintained at all times, which is less efficient than an electric floor heating system.

In order to facilitate even heating of a floor, the wires must preferably be spaced at specific locations. One such system is disclosed in U.S. Patent Application Publication No. 2009/0026192 to Fuhrman ("Fuhrman"), which is incorporated by reference in its entirety herein. Fuhrman discloses a mat with a plurality of studs extending therefrom that help dictate the location of the wires. The mat with associated studs is placed over a sub floor with a layer of adhesive therebetween. Another layer of adhesive is placed above of the studs. The studs also guide the finishers to form a correct floor thickness. The studs thus provide a location for interweaving the wire or wires that are used in the heating system. The wire of Fuhrman, however, is not secured between adjacent studs and still may separate therefrom, which may cause uneven heating or wire damage. Furthermore, Fuhrman discloses a continuous mat wherein subsequent layers of adhesive are not able to interact with those previously placed.

SUMMARY

It is with respect to the above issues and other problems that the embodiments presented herein were contemplated. In general, embodiments of the present disclosure provide methods, devices, and systems by which various elements, such as wire, heating elements, and the like, may be routed and/or contained in a flooring underlayment. In one embodiment, the underlayment may include a number of protrusions extending from a base material. The protrusions may be configured in a cluster, or array, or even as part of another protrusion, forming routing hubs. As provided herein, a wire may be routed around, through, and even around and through the routing hubs and/or protrusions. The unique shape and arrangement of the protrusions disclosed herein can provide for the efficient routing of wires in an underlayment for any shape and/or purpose.

In some embodiments, the protrusion forms a geometric shape extending away from a base material surface to a contact surface (e.g., the contact surface for flooring, tile, etc.). This extension between the base material surface and the contact surface defines the overall protrusion height. The protrusion may include a number of sides extending from the base material to the contact surface. As can be appreciated, at least one of the sides of the protrusion may include a surface configured to receive a wire. This receiving surface can be concave, convex, arcuate, linear, etc., and/or combinations thereof. Additionally or alternatively, the surface may follow, or contour, the geometric shape of the protrusion.

It is an aspect of the present disclosure that at least two protrusions are arranged adjacent to one another on an underlayment base material. In one embodiment, the protrusions may be arranged such that the receiving surface of a first protrusion is offset from and facing the receiving surface of a second protrusion. The distance of the offset and the receiving surfaces can form a receiving cavity configured to receive a wire, heating element, or other element. For example, an underlayment may include a number of protrusions arranged about an array axis to form a routing hub. Where four protrusions make up a routing hub, there may exist heating element receiving cavities disposed between each protrusion. Additionally or alternatively, the underlayment may include a number of routing hubs equally-spaced along a first linear direction and/or a second linear direction to form a matrix of routing hubs. In this case, additional heating element receiving cavities may be disposed between each routing hub. As can be appreciated, the matrix of routing hubs and the array of protrusions allow for heating elements to be routed in the underlayment according to any configuration of routing curves, angles, and/or lines.

In some embodiments, the protrusions, base material, and/or other features of the underlayment may be formed into a shape from at least one material. Examples of forming can include, but are not limited to, thermoforming, thermomolding, injection molding, casting, molding, rotational molding, reaction injection, blow molding, vacuum forming, twin sheet forming, compression molding, machining, 3D printing, etc., and/or combinations thereof.

The protrusions, base material, and/or other features of the underlayment may include a number of cutouts, or holes. In some embodiments, the cutouts can extend at least partially into the protrusion, base material, and/or the underlayment. In one embodiment, one or more of the cutouts may completely pass through the underlayment. In any event, the cutouts may be configured to receive a mating material. For instance, the cutouts may be configured to receive adhesive, epoxy, grout, cement, glue, plastic, or other material capable of flowing at least partially into the cutouts. These cutouts can provide a number of surfaces on the underlayment to which material can adhere, or key. Additionally or alternatively, these cutouts can increase the strength of the underlayment by providing a structural skeleton, around which material can flow and cure in addition to providing a pathway for airflow, thereby enabling the utilization of a modified thinset, which requires air for curing. The cutouts further provide a passageway for moisture to flow out of the subfloor. In one embodiment, the cutouts may be provided via the forming process of the underlayment. In another embodiment, the cutouts may be made via a cutting operation performed prior to the forming process. In yet another embodiment, the cutouts may be made via a cutting operation performed subsequent to the forming process.

The underlayment may include areas in and/or between the routing hubs that are configured to receive material. For instance, the areas may be configured to receive adhesive, epoxy, grout, cement, glue, plastic, or other material capable of flowing at least partially into the areas. These areas can provide a number of surfaces on the underlayment to which material can adhere, or key. Additionally or alternatively, these areas can increase the strength of the underlayment by providing a structural skeleton, around which material can flow and cure.

In some embodiments, the underlayment may include a pad layer. The pad layer may include a sound dampening material, heat reflective material, insulative material, porous substrate, vapor barrier, waterproof material, energy reflective material, etc., and/or combinations thereof. Examples of pad layers can include, but are in no way limited to, foil, cork, rubber, plastic, concrete, wood, organic materials, inorganic materials, composites, compounds, etc., and/or combinations thereof. The pad layer may be attached to the base material via adhesive, thermal bonding, welding, mechanical attachment, etc., and/or combinations thereof. As can be appreciated, the pad layer may include adhesive on the side opposite the base material side for affixing to a surface, such as a subfloor, floor, etc. In one embodiment, the pad layer may be configured to receive adhesive for affixing to a surface.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 7 shows a detail cross-sectional view of a first embodiment of the routing hubs taken along line D-D shown in FIG. 6; and FIG. 8 shows a detail cross-sectional view of a second embodiment of the routing hubs taken along line D-D shown in FIG. 6.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
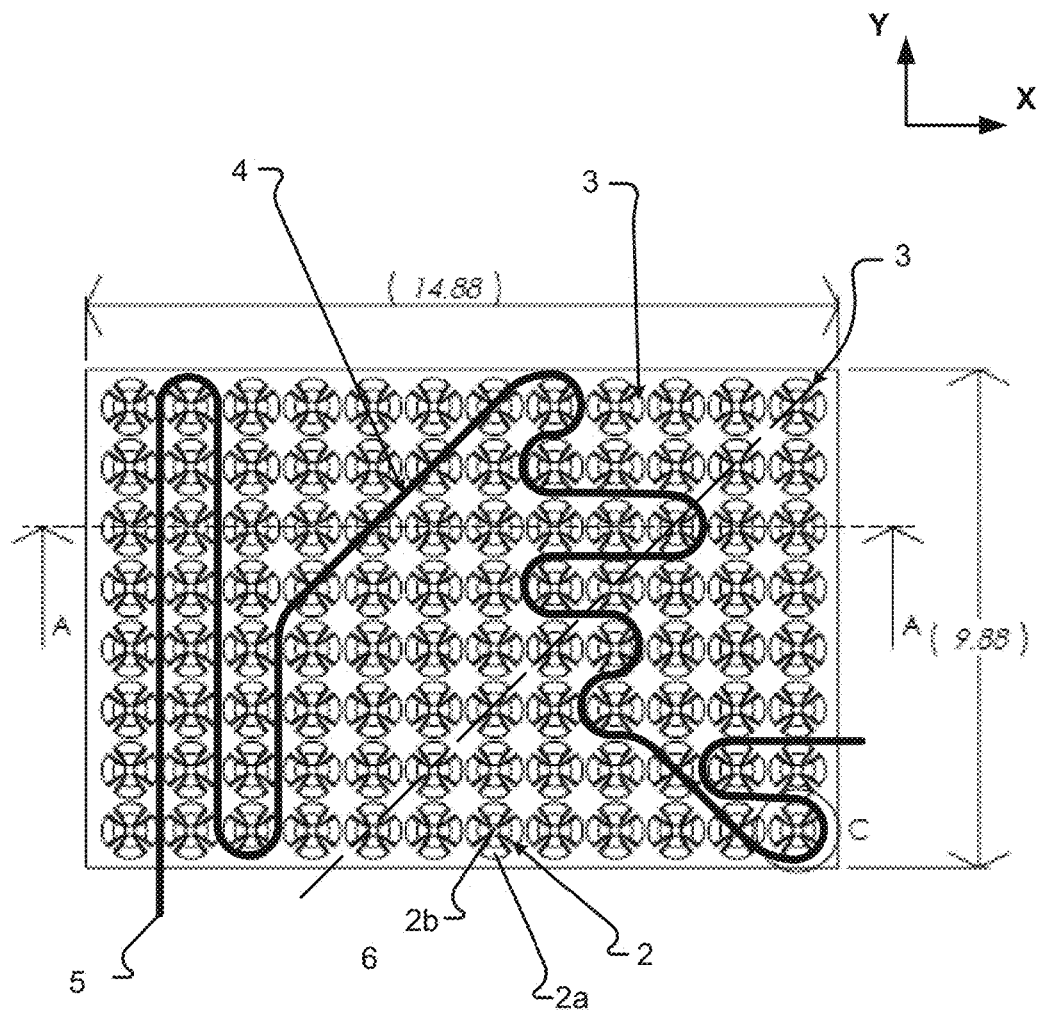
FIG. 1 shows a plan view of an underlayment section in accordance with embodiments of the present disclosure.

FIG. 1 shows a plan view of an underlayment section 1 in accordance with embodiments of the present disclosure. The underlayment section 1 includes a number of routing hubs 2, comprising four protrusions 2a arranged in an equally-spaced circular array about an array axis 2b, in a matrix configuration. The matrix is configured in the form of an eight row by twelve column matrix of routing hubs 2. The matrix provides heating element receiving cavities 3 in the X-direction, Y-direction, and in directions approximately 45 degrees to the X-direction and/or the Y-direction. A sample routing 4 of the heating element 5 is shown in FIG. 1. In particular, the heating element section 5 shown runs along the Y-direction between the first and second columns of routing hubs 2, proceeds around the routing hub 2 in the first row and second column (2, 8) and along the negative Y-direction between the second and third columns to the (3, 1) routing hub 2, proceeds along the Y-direction between the third and fourth columns until about the (3, 4) routing hub 2, and then proceeds diagonally through the heating element receiving cavities 3 in the (4, 5), (5, 6), (6, 7), and (7, 8) routing hubs 2, and so on.

Figure 2:
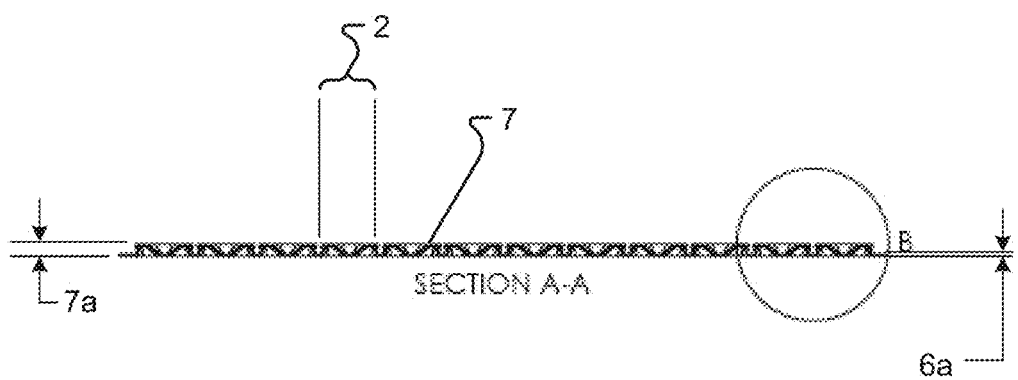
FIG. 2 shows a cross-sectional view of an area of the underlayment taken along line A-A shown in FIG. 1.

FIG. 2 shows a cross-sectional view of an area of the underlayment 1 taken along line A-A. In some embodiments, one or more of the protrusions 2a can extend from the base material surface 6 to a contact surface 7. The contact surface 7 may be configured to support tile, flooring, or other material. The distance from the base material 6 to the contact surface 7 is called the protrusion height 7a. The thickness of the base material 6 is called the base thickness 6a. In some embodiments, the protrusions 2a may be formed from the base material 6, and as such, may have a wall thickness approximately equal to that of the base thickness 6a.

Figure 3:
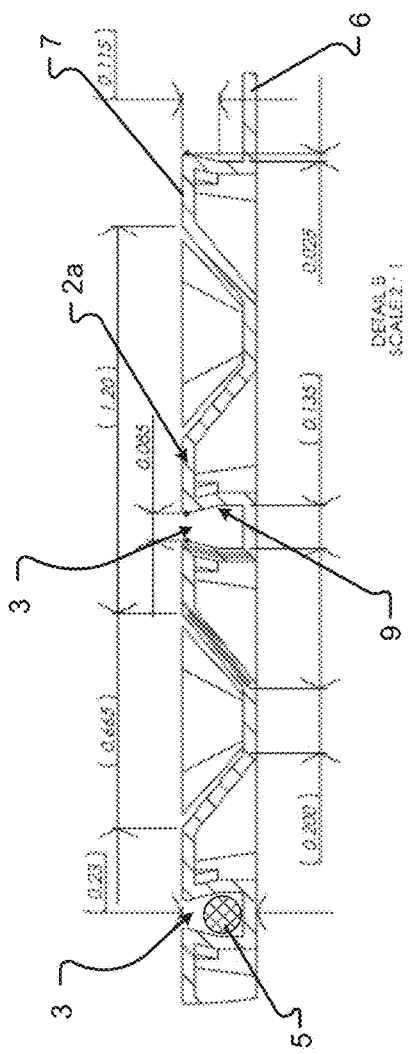
FIG. 3 shows a detail cross-sectional view of an area of the underlayment in accordance with embodiments of the present disclosure.

FIG. 3 shows a detail cross-sectional view of an area of the underlayment 1 in accordance with embodiments of the present disclosure. In one embodiment, the areas adjacent to each protrusion 2a can form a heating element receiving cavity 3. Each heating element receiving cavity 3 can include an interference fit 8, or contained area, to hold a heating element 5 or wire in place. In some cases, the heating element 5 may be inserted into the heating element receiving cavity 3 with a predetermined amount of force required to part (e.g., elastically deform, plastically deform, flex, and/or deflect, etc.) at least one of the receiving surfaces 9 of the cavity. In one embodiment, when the heating element 5 is inserted into the heating element receiving cavity 3 the at least one of the receiving surfaces 9 may return to an original position thereby closing the heating element receiving cavity 3 and containing the heating element 5.

Figure 4:
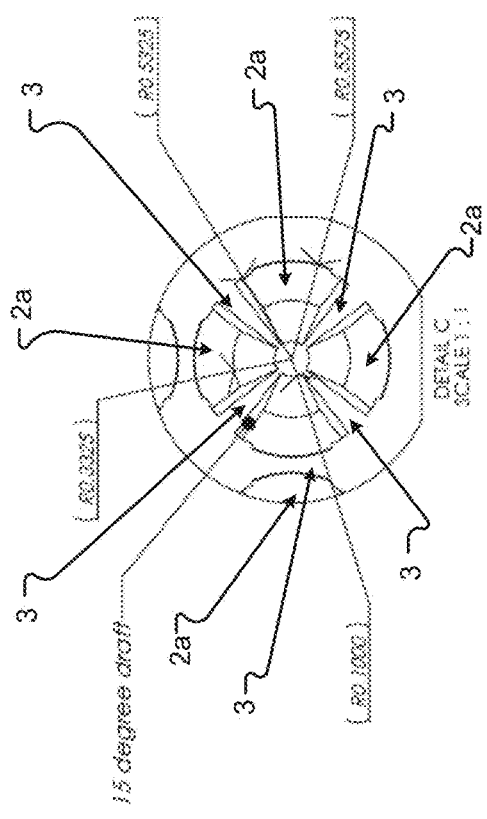
FIG. 4 shows a detail plan view of a routing hub of the underlayment in accordance with embodiments of the present disclosure.

FIG. 4 shows a detail plan view of a routing hub 2 of the underlayment 1 in accordance with embodiments of the present disclosure. The heating element receiving cavities 3 are shown disposed between protrusions 2a and/or routing hubs 2. In some embodiments, one or more of the heating element receiving cavities 3 can be configured differently from another heating element receiving cavity 3. For instance, several heating element receiving cavities 3 may be configured to provide a frictional fit for holding a heating element 5, while other heating element receiving cavities 3 may be configured to merely contain a heating element 5. In any event, the underlayment 1 can include one or more configurations of heating element receiving cavity 3.

Figure 5:
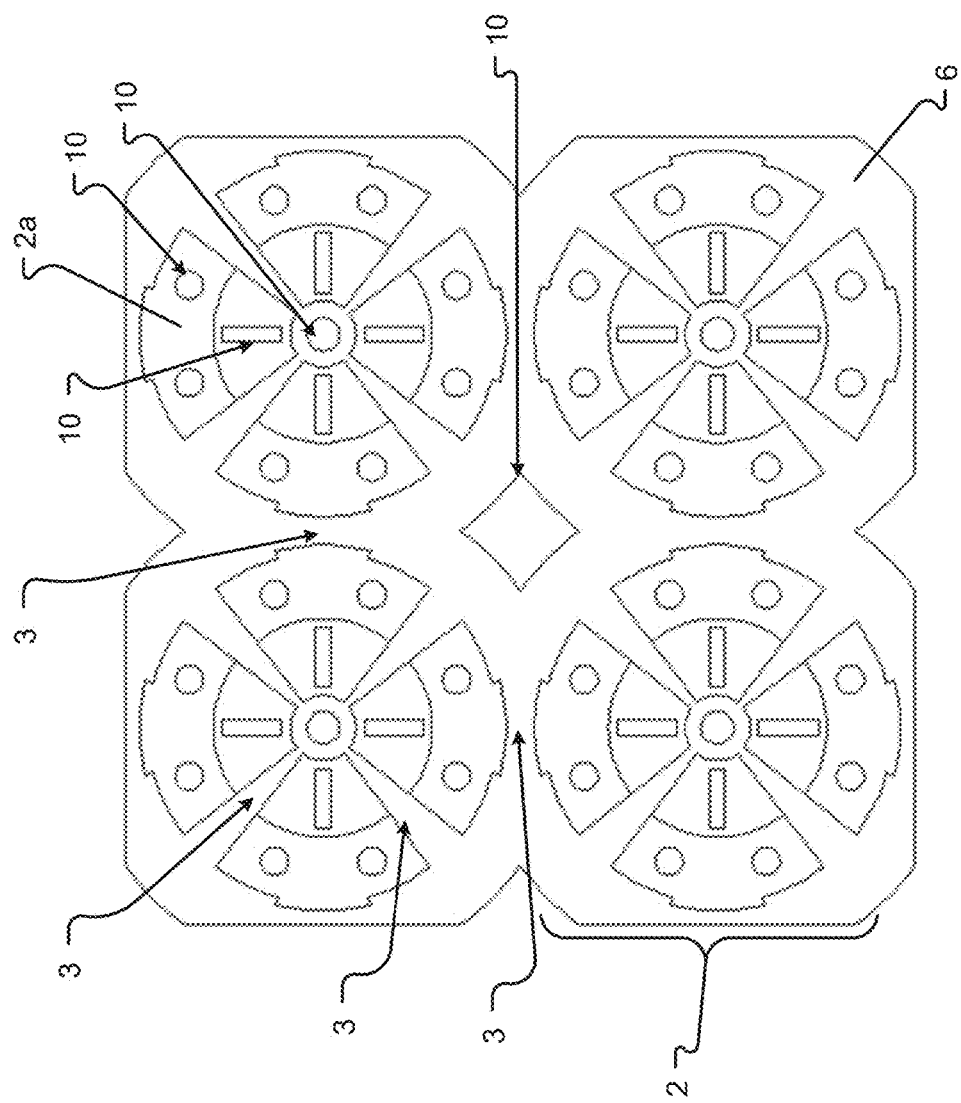
FIG. 5 shows a plan view of routing hubs of an underlayment in accordance with a first embodiment of the present disclosure.

FIG. 5 shows a plan view of routing hubs 2 of an underlayment 1 in accordance with a first embodiment of the present disclosure. As described above, the protrusions 2a, base material 6, and/or other features of the underlayment 1 may include a number of cutouts 10, or holes. In some embodiments, the cutouts 10 can extend at least partially into the protrusion 2a, base material 6, and/or the underlayment 1. In some embodiments, the cutouts 10 are shown as extending at least partially into at least one side of at least one protrusion 2a.

Figure 6:
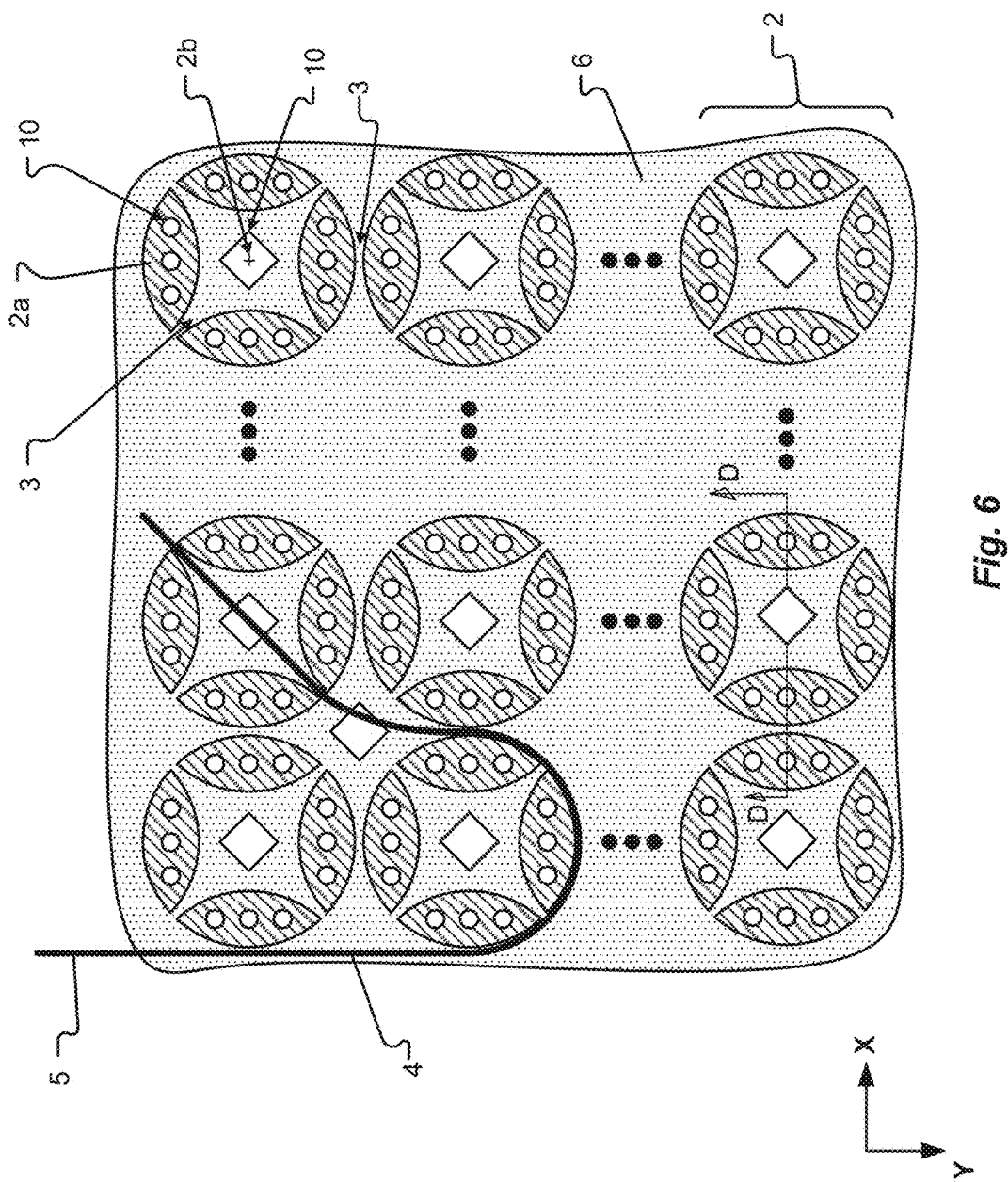
FIG. 6 shows a plan view of routing hubs of an underlayment in accordance with a second embodiment of the present disclosure.

FIG. 6 shows a plan view of routing hubs 2 of an underlayment 1 in accordance with a second embodiment of the present disclosure. The underlayment 1 section includes a number of routing hubs 2, comprising four protrusions 2a arranged in an equally-spaced circular array about an array axis 2b, in a matrix configuration. A sample routing 4 of the heating element 5 is shown in FIG. 6. In particular, the heating element section 5 shown runs along the Y-direction of the first column of routing hubs 2, proceeds around the routing hub 2 in the second row and first column (1, 2) and along the negative Y-direction between the first and second columns, and then proceeds diagonally through the heating element receiving cavity 3 in the (2, 1) routing hub 2.

FIG. 7 shows a detail cross-sectional view of a first embodiment of the routing hubs 2 taken along line D-D shown in FIG. 6. As shown, the heating element receiving cavity 3 in FIG. 7 includes arcuate receiving surfaces 9. The arcuate receiving surfaces 9 may be configured as concave, curvilinear, arched, and/or other shape configured to receive the heating element 5. In some cases, at least one of the arcuate receiving surfaces 9 of the routing hubs may be configured to contact the heating element receiving cavity 3. The contact may provide a frictional force that retains the heating element 5 in the underlayment 1. In some embodiments, the arcuate receiving surfaces 9 may contain the heating elements 5 in the heating element receiving cavity 5 without frictional contact.

Additionally or alternatively, the underlayment 1 may include a pad layer 11. The pad layer 11 may include a sound dampening material, heat reflective material, insulative material, porous substrate, vapor barrier, waterproof material, energy reflective material, etc., and/or combinations thereof. Examples of pad layers 11 can include, but are in no way limited to, foil, cork, rubber, plastic, concrete, wood, organic materials, inorganic materials, composites, compounds, etc., and/or combinations thereof. The pad layer 11 may be attached to the base material 6 via adhesive, thermal bonding, welding, mechanical attachment, etc., and/or combinations thereof. As can be appreciated, the pad layer 11 may include adhesive on the side opposite the base material 6 side for affixing to a surface, such as a subfloor, floor, etc. In one embodiment, the pad layer 11 may be configured to receive adhesive for affixing to a surface. It should be appreciated that any of the underlayment 1 embodiments as disclosed may include such a pad layer 11. In some embodiments, there may be additional pad layers 11, one above another (e.g., a stack of two, three, four, five, or more pad layers 11) for strengthening and controlling anti-fracture. This enables isolation of cracks in a substrate from traveling to the tile layer.

FIG. 8 shows a detail cross-sectional view of a second embodiment of the routing hubs 2 taken along line D-D shown in FIG. 6. As shown, the heating element receiving cavity 3 in FIG. 8 includes angular receiving surfaces 9. The angular receiving surfaces 9 may be configured as a draft angle 9a, a dovetail, a "V" shape, or other channel shape configured to receive the heating element 5. In some cases, at least one of the angular receiving surfaces 9 of the routing hubs 2 may be configured to contact the heating element receiving cavity 3. The contact may provide a frictional force that retains the heating element 5 in the underlayment 1. In some embodiments, the angular receiving surfaces 9 may contain the heating elements 5 in the heating element receiving cavity 5 without frictional contact.

The exemplary systems and methods of this disclosure have been described in relation to electronic shot placement detecting systems and methods. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A floor underlayment comprising:
   a base having a bottom side and a top side; and
   a plurality of protrusions extending above the top side, the plurality of protrusions including a protrusion comprising:
   a contact surface having a variable width;
   a rounded outer wall extending from the contact surface to the top side of the base and sloping underneath the contact surface; and
   a rounded inner wall sloping continuously away from the contact surface to the top side of the base,
   wherein the contact surface connects the rounded outer wall to the rounded inner wall.

2. The floor underlayment of claim 1, wherein the rounded inner wall faces a rounded inner wall of another protrusion of the plurality of protrusions.

3. The floor underlayment of claim 1, wherein the rounded outer wall and the rounded inner wall are rounded in a horizontal plane.

4. The floor underlayment of claim 1, wherein the rounded outer wall and the rounded inner wall are rounded in the same direction.

5. The floor underlayment of claim 1, wherein the plurality of protrusions are equally spaced along a first linear direction and a second linear direction perpendicular to the first linear direction to form a matrix of protrusions.

6. The floor underlayment of claim 1, wherein the underlayment is configured to receive, adjacent the rounded inner wall and adjacent the rounded outer wall, at least one of adhesive, epoxy, grout, cement, glue, and plastic.

7. The floor underlayment of claim 1, further comprising a pad layer attached to the bottom side of the base.

8. The floor underlayment of claim 7, wherein the pad layer comprises a sound dampening material.

9. The floor underlayment of claim 7, wherein the pad layer comprises a heat reflective material.

10. The floor underlayment of claim 7, wherein a first side of the pad layer is attached to the bottom side of the base, and a second side of the pad layer opposite the first side comprises adhesive for affixing the pad layer to a surface.

11. An underlayment comprising:
 a base material having a bottom side and a top side; and
 a plurality of routing hubs extending from the top side of the base material, the plurality of routing hubs including a routing hub comprising:
  a contact surface having a variable width;
  a rounded outer wall extending from the contact surface to the top side of the base material and sloping underneath the contact surface; and
  a rounded inner wall curved in the same direction as the rounded outer wall and sloping continuously away from the contact surface to the top side of the base material,
  wherein the contact surface connects the rounded outer wall to the rounded inner wall.

12. The underlayment of claim 11, wherein the rounded inner wall and the rounded outer wall are curved in a horizontal plane.

13. The underlayment of claim 11, wherein the rounded outer wall has a larger radius of curvature than the rounded inner wall.

14. The underlayment of claim 11, further comprising a heating element in contact with the rounded outer wall.

15. The underlayment of claim 11, further comprising a pad layer attached to the bottom side of the base material, the pad layer comprising an insulative material.

16. An underlayment comprising:
 a pad layer;
 a base having a top side and a bottom side, the bottom side in contact with the pad layer; and
 a matrix of routing hubs extending from the top side away from the pad layer, the matrix of routing hubs including a routing hub comprising:
  a contact surface;
  a sloping outer wall extending from the contact surface to the top side of the base, the sloping outer wall extending underneath the contact surface;
  an inner wall sloping continuously from the contact surface to the top side of the base and away from the sloping outer wall; and
  wherein the base, the sloping outer wall, the contact surface, and the inner wall form a continuous surface, and further wherein a base thickness of the base is approximately equal to a wall thickness of the sloping outer wall.

17. The underlayment of claim 16, wherein the inner wall is curved in a horizontal plane.

18. The underlayment of claim 16, wherein the sloping outer wall has a variable slope.

19. The underlayment of claim 16, wherein the pad layer comprises an anti-fracture membrane.

20. The underlayment of claim 16, wherein the inner wall at least partially defines a volume for receiving at least one of adhesive, epoxy, grout, cement, glue, and plastic.

\* \* \* \* \*